(12) United States Patent
Li et al.

(10) Patent No.: US 12,010,358 B2
(45) Date of Patent: Jun. 11, 2024

(54) LIVE STREAMING MODERATING METHOD AND APPARATUS, SERVER, AND STORAGE MEDIUM

(71) Applicant: BIGO TECHNOLOGY PTE. LTD., Singapore (SG)

(72) Inventors: Yiyong Li, Guangzhou (CN); Zhun Sun, Guangzhou (CN); Qiushi Huang, Guangzhou (CN); Xue Jing, Guangzhou (CN); Wei Xiang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/259,646

(22) PCT Filed: Dec. 27, 2021

(86) PCT No.: PCT/CN2021/141704
§ 371 (c)(1),
(2) Date: Jun. 28, 2023

(87) PCT Pub. No.: WO2022/143541
PCT Pub. Date: Jul. 7, 2022

(65) Prior Publication Data
US 2023/0396816 A1    Dec. 7, 2023

(30) Foreign Application Priority Data
Dec. 30, 2020    (CN) .......................... 202011613190.6

(51) Int. Cl.
*H04N 21/2187*    (2011.01)
*G06V 40/20*    (2022.01)
*H04N 21/234*    (2011.01)

(52) U.S. Cl.
CPC ......... *H04N 21/2187* (2013.01); *G06V 40/20* (2022.01); *H04N 21/23418* (2013.01)

(58) Field of Classification Search
CPC ......... H04N 21/2187; H04N 21/23418; G06V 40/20
See application file for complete search history.

(56) References Cited

U.S. PATENT DOCUMENTS 8,788,442 B1    7/2014    Sculley, II et al.
2017/0289624 A1    10/2017    Avila et al.
(Continued)

FOREIGN PATENT DOCUMENTS

CN    107197331 A    9/2017
CN    107959863 A    4/2018
(Continued)

OTHER PUBLICATIONS

International Search Report of the International Searching Authority for State Intellectual Property Office of the People's Republic of China in PCT application No. PCT/CN2021/141704 dated Mar. 9, 2022, which is an international application to which this application claims priority.
(Continued)

*Primary Examiner* — Michael R Telan
(74) *Attorney, Agent, or Firm* — Kolitch Romano Dascenzo Gates LLC (57) ABSTRACT

Provided is a method for moderating live streaming. The method includes: performing preliminary violation moderation on a current live streaming frame in a to-be-moderated live streaming room based on a high-accuracy moderation model and a high-recall moderation model that are cascaded with each other; and acquiring a target violation score of the current live streaming frame by inputting a first violation score of the current live streaming frame under the high-
(Continued)

accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation.

15 Claims, 4 Drawing Sheets

(56) References Cited

U.S. PATENT DOCUMENTS

| | | | | |
|---|---|---|---|---|
| 2018/0176641 | A1* | 6/2018 | Yun | H04N 21/4542 |
| 2019/0253744 | A1* | 8/2019 | Huang | H04N 21/251 |

FOREIGN PATENT DOCUMENTS

| | | |
|---|---|---|
| CN | 109766807 A | 5/2019 |
| CN | 109831698 A | 5/2019 |
| CN | 109862394 A | 6/2019 |
| CN | 111079816 A | 4/2020 |
| CN | 111090776 A | 5/2020 |
| CN | 111225234 A | 6/2020 |
| CN | 111382605 A | 7/2020 |
| CN | 111382623 A | 7/2020 |
| CN | 111385602 A | 7/2020 |
| CN | 111506708 A | 8/2020 |
| CN | 112788356 A | 5/2021 |
| JP | 2020154840 A | 9/2020 |

OTHER PUBLICATIONS

The State Intellectual Property Office of People's Republic of China, First Office Action in Patent Application No. 202011613190.6 dated Oct. 8, 2022, which is a foreign counterpart application corresponding to this U.S. Patent Application, to which this application claims priority.
Notification to Grant Patent Right dated Mar. 23, 2023 for Invention of Chinese Application No. 202011613190.6, which is foreign counterpart application of this US application.
Extended European Search Report Communication Pursuant to Rule 62 EPC for European Application No. 21914277.5 dated Apr. 9, 2024, which is a foreign counterpart application to this application.
Notice of Reasons for Refusal of Japanese application No. 2023-540184 issued on Apr. 15, 2024.

* cited by examiner

LIVE STREAMING MODERATING METHOD AND APPARATUS, SERVER, AND STORAGE MEDIUM

CROSS-REFERENCE TO RELATED APPLICATIONS

The present disclosure is a U.S. national stage of international application No. PCT/CN2021/141704, filed on Dec. 27, 2021, which is based on and claims priority to Chinese Patent Application No. 202011613190.6, filed on Dec. 30, 2020, the disclosures of which are herein incorporated by references in their entireties.

TECHNICAL FIELD

The present disclosure relates to the field of moderation of violation content in Internet resources, for example, relates to a method and apparatus for moderating living streaming, a server, and a storage medium.

BACKGROUND OF THE INVENTION

With the rapid development of Internet technology, there are increasingly live streaming platforms on the Internet, and Internet resources are spread extensively. Meanwhile, as live streaming content of some live streaming rooms involves topics of terrorism, violence, pornography, political sensitivity, and the like, a large number of violation live streaming content can be quickly spread over the Internet. Therefore, violation live streaming content needs to be moderated in real time for this type of live streaming rooms to prevent the spread of the violation live streaming content.

SUMMARY OF THE INVENTION

Embodiments of the present disclosure provide a method and apparatus for moderating live streaming, a server, and a storage medium.

A method for moderating live streaming is provided. The method includes:
performing preliminary violation moderation on a current live streaming frame in a to-be-moderated live streaming room based on a high-accuracy moderation model and a high-recall moderation model that are cascaded with each other; and
acquiring a target violation score of the current live streaming frame by inputting a first violation score of the current live streaming frame under the high-accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation; wherein performing the preliminary violation moderation on the current live streaming frame in the to-be-moderated live streaming room based on the high-accuracy moderation model and the high-recall moderation model that are cascaded with each other includes: acquiring the first violation score of the current live streaming frame by inputting the current live streaming frame in the to-be-moderated live streaming room to the pre-constructed high-accuracy moderation model; and acquiring the second violation score of the current live streaming frame by continuously inputting the current live streaming frame to the pre-constructed high-recall moderation model in response to the first violation score failing to exceed a predetermined accuracy violation threshold; wherein the current live streaming frame is determined to pass the preliminary violation moderation in response to the first violation score of the current live streaming frame failing to exceed the predetermined accuracy violation threshold and the second violation score of the current live streaming frame failing to exceed a predetermined recall violation threshold.

A server is further provided. The server includes:
one or more processors; and
a memory, configured to store one or more programs.

The one or more processors, when loading and running the one or more programs, are caused to perform the method for moderating live streaming according to any embodiment of the present disclosure.

A computer-readable storage medium is further provided, storing a computer program. The computer program, when loaded and run by a processor, causes the processor to perform the method for moderating live streaming according to any embodiment of the present disclosure.

DETAILED DESCRIPTION OF THE INVENTION

The present disclosure will be described hereinafter with reference to the accompanying drawings and embodiments. The embodiments described herein are merely for the purpose of explaining the present disclosure but not limiting the present disclosure. For convenience of description, only the portions relevant to the present disclosure are shown in the drawings, not all portions. In addition, the embodiments and features of the embodiments in the present disclosure may be combined with each other without conflict.

In moderating the violation live streaming content in real time, violation content analysis is typically performed, by a neural network model trained by single features, on live streaming visual features embodied by a plurality of live streaming video frames and live streaming audio features of live streaming voices in a live streaming process, such that whether violation pictures exist in the plurality of live streaming video frames or whether violation audios related to terrorism, violence, pornography, political sensitivity, or other topics exist in the live streaming voices is determined. The suspicious violation live streaming rooms found by the moderation are pushed to a manual moderation platform for manual moderation. When extracting the live streaming video frames and the live streaming voices in the live streaming process, inaccurate extraction results due to the instability of a live streaming network is present. Therefore, in reviewing whether violation content exists in a live streaming room based on the extracted live streaming video frames and live streaming voices, the accuracy and recall rate of violation moderation of the live streaming room are not ensured, and false rejection or false acceptance is easily caused.

First Embodiments

Figure 1A:
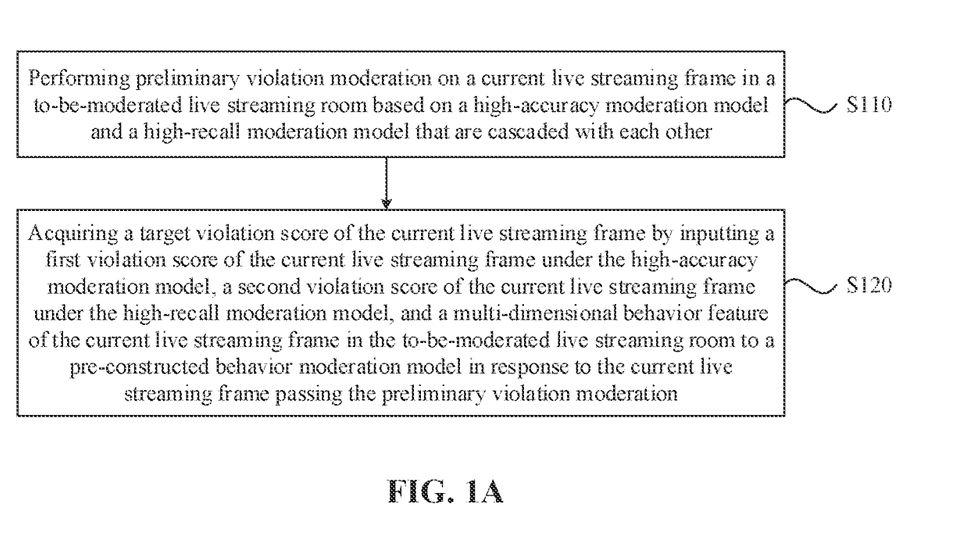
FIG. 1A is a flow chart of a method for moderating living streaming according to first embodiments of the present disclosure.

FIG. 1A is a flowchart of a method for moderating living streaming according to first embodiments of the present disclosure. The embodiments are applicable to violation moderation of live streaming screens in any live streaming room. The method for moderating living streaming in the embodiments is performed by an apparatus for moderating living streaming in the embodiments of the present disclosure. The apparatus is implemented in a software and/or hardware manner, and is integrated in a server performing the method. The server is a backend server having a video moderation capability.

Referring to FIG. 1A, the method includes the following steps.

In S110, preliminary violation moderation is performed on a current live streaming frame in a to-be-moderated live streaming room based on a high-accuracy moderation model and a high-recall moderation model that are cascaded with each other.

As a variety of audiences typically participate in a live streaming room, in the case that live streaming content of some live streaming rooms involves or implies topics, such as terrorism, violence, pornography, or political sensitivity, the violation content is quickly spread over the Internet. Therefore, for prevention of adverse effects of the violation content on the life of a user, whether the violation live streaming content exists needs to be reviewed in real time in a live streaming process.

In the embodiments, the whole moderation process of the live streaming moderation is divided into preliminary violation moderation and secondary violation moderation to ensure the comprehensiveness of violation moderation of the live streaming. In this case, in the preliminary violation moderation process, obvious violation live streaming that is easily distinguished can be quickly found by moderation. In the secondary violation moderation process, a stricter violation moderation than the preliminary violation moderation is used to perform violation moderation again on a live streaming frame that whether to have violation content cannot be accurately determined in the preliminary violation moderation, such that the problems of false rejection and false acceptance in the live streaming moderation are avoided, and the comprehensive violation moderation of the current live streaming frame in the to-be-moderated live streaming room is ensured.

In the embodiments, two network models, that is, a high-accuracy moderation model and a high-recall moderation model are pre-constructed in the preliminary violation moderation process. The high-accuracy moderation model has high-accuracy violation moderation capability. In the case that the violation moderation is performed on the current live streaming frame in the to-be-moderated live streaming room by the high-accuracy moderation model, the determined violation live streaming frame is very likely to be violation, such that the problem of a false rejection of the violation moderation is avoided. The high-recall moderation model has high-recall violation moderation capability. In the case that the violation moderation is performed on the current live streaming frame in the to-be-moderated live streaming room by the high-recall moderation model, the violation content in the current live streaming frame can be found even if the current live streaming frame has little violation content, such that the phenomenon of false acceptance of violation moderation can be reduced.

In the embodiments, a training sample set is pre-constructed in training the high-accuracy moderation model and the high-recall moderation model. The training sample set includes history live streaming frames in history live streaming videos in various kinds of live streaming rooms. Based on whether each history live streaming frame is really violation and a difficulty of accurately moderating the violation, training samples in the training sample set are divided into four types: easy positive samples, easy negative samples, hard positive samples, and hard negative samples. The easy positive samples and the easy negative samples respectively refer to positive samples and negative samples that are easily recognized for violation by the models, and the hard positive samples and the hard negative samples respectively refer to positive samples and negative samples that are difficult to be recognized for violation by the models. In this way, as the high-accuracy moderation model has a relatively high requirement on the accuracy of violation moderation, training samples for the high-accuracy moderation model include the easy positive samples and the easy negative samples in the training sample set, and model parameters, network structures, and the like of the high-accuracy moderation model are continuously optimized by reviewing whether violation content exists in the easy positive samples and the easy negative samples. As the high-recall moderation model has a relatively high requirement on the recall property of violation moderation, training samples for the high-recall moderation model include the hard positive samples and the hard negative samples in the training sample set, and moderation training is performed based on the training samples that are difficult to be moderated for violation, such that the high-recall moderation model can also moderate and find violation live streaming frames that are difficult to be found by moderation, and the high-recall property of the high-recall moderation model for the violation moderation is ensured.

Figure 1B:
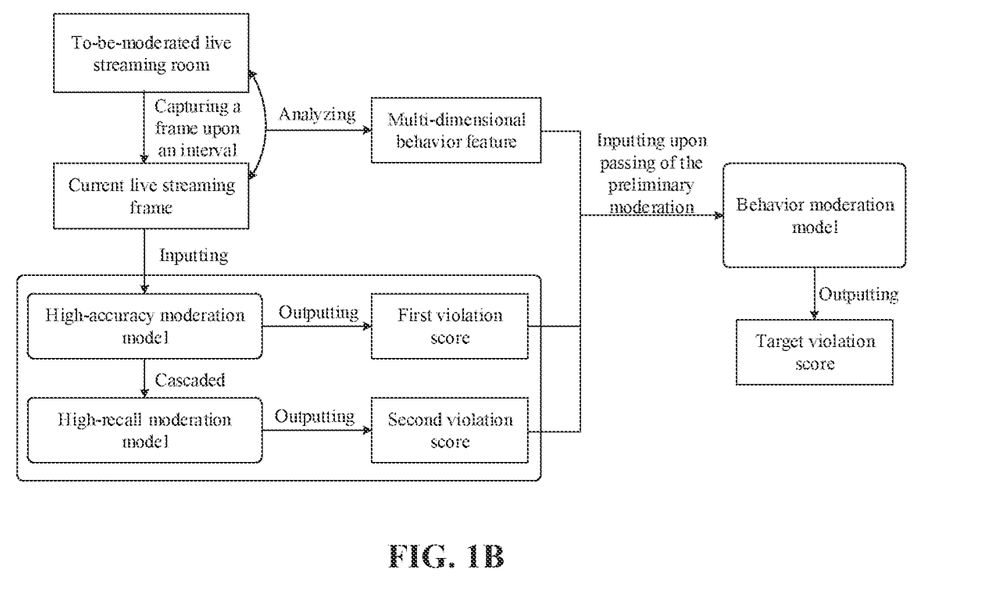
FIG. 1B is a schematic diagram of a live streaming moderation process according to first embodiments of the present disclosure.

Meanwhile, as the high-accuracy moderation model is trained only for the accuracy of violation moderation and can cause false acceptance of violation moderation, and the high-recall moderation model has high-recall violation moderation capability and can reduce the situations in which the false acceptance of violation moderation occurs, the high-accuracy moderation model is cascaded to the high-recall moderation model to ensure high accuracy and high recall property of the preliminary violation moderation in the embodiments. As shown in FIG. 1B, the high-accuracy moderation model is firstly used to perform the preliminary violation moderation on each current live streaming frame in the to-be-moderated live streaming room, and the high-recall moderation model continuously performs the violation moderation on current live streaming frames that are not found to have a violation by the high-accuracy moderation model, such that the two-layer cascaded moderation models are used to perform the violation moderation to complete the preliminary violation moderation process in the embodiments, and the high accuracy and high recall property of the preliminary violation moderation are ensured.

In a video live streaming process of the to-be-moderated live streaming room, a live streaming picture is captured from the to-be-moderated live streaming room every predetermined duration (such as every 2 s) and is determined as the current live streaming frame in the embodiments, and the current live streaming frame is input to the high-accuracy moderation model in the two-layer cascaded network. The high-accuracy moderation model determines whether violation content exists in the current live streaming frame. In the case that the current live streaming frame passes the violation moderation of the high-accuracy moderation model, the high-accuracy moderation model determines that no violation content exists in the current live streaming frame. As the high-accuracy moderation model can cause false acceptance of violation moderation, the current live streaming frame needs to be further input to the high-recall moderation model in the two-layer cascaded network, and the high-recall moderation model continues to determine whether violation content exists in the current live streaming frame, such that the preliminary violation moderation performed on the current live streaming frame in the to-be-moderated live streaming room is completed.

In this case, the high-recall moderation model has two violation moderation results for the current live streaming frame. 1) In the case that the current live streaming frame fails in passing the violation moderation of the high-recall moderation model, the high-recall moderation model can determine that violation content exists in the current live streaming frame and directly confirms that the to-be-moderated live streaming room of the current live streaming frame is a violation live streaming room. 2) In the case that the current live streaming frame passes the violation moderation of the high-recall moderation model, the high-recall moderation model determines that no violation content exists in the current live streaming frame, and a pre-constructed behavior moderation model needs to be subsequently used to continuously perform the violation moderation on the current live streaming frame.

In S120, a target violation score of the current live streaming frame is obtained by inputting a first violation score of the current live streaming frame under the high-accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation.

In some embodiments, in the case that the current live streaming frame in the to-be-moderated live streaming room passes the violation moderation of the high-accuracy moderation model and the violation moderation of the high-recall moderation model, the current live streaming frame passes the preliminary violation moderation, and the secondary violation moderation needs to be performed to ensure the accuracy and comprehensiveness of the violation moderation.

In performing the preliminary violation moderation on the current live streaming frame by the high-accuracy moderation model and the high-recall moderation model that are cascaded with each other, violation analysis is usually performed on information of a live streaming visual picture of the current live streaming frame. In this case, the high-accuracy moderation model outputs the first violation score of the current live streaming frame, and the high-recall moderation model outputs the second violation score of the current live streaming frame. Both the first violation score and the second violation score can represent visual picture features of the current live streaming frame.

However, live streaming content in a live streaming room is various, and a live streamer interacts with an audience in the live streaming room for the live streaming content, for example, rewarding the live streaming, commenting on a public screen, and showing history violations of the live streamer, such that interaction behaviors in the live streaming room can also be used as a reference for determining whether violation content exists in the current live streaming frame. Therefore, in the embodiments, upon the current live streaming frame passing the preliminary violation moderation, in performing the secondary violation moderation on the current live streaming frame, a multi-dimensional behavior feature of the current live streaming frame in the to-be-moderated live streaming room is determined by analyzing multiple live streaming interaction behaviors of the live streamer and the audience in the to-be-moderated live streaming room at live streaming time of the current live streaming frame in the to-be-moderated live streaming room in addition to referring to the visual picture features represented by the first violation score of the current live streaming frame under the high-accuracy moderation model and the second violation score of the current live streaming frame under the high-recall moderation model. And as shown in FIG. 1B, the visual picture features represented by the first violation score and the second violation score of the current live streaming frame and the multi-dimensional behavior feature determined by the multiple live streaming interaction behaviors in the to-be-moderated live streaming room are combined and are jointly input to the pre-constructed behavior moderation model. The behavior moderation model can perform fusion analysis on the visual picture features represented by the first violation score and the second violation score and the multi-dimensional behavior feature determined by the multiple live streaming interaction behaviors in the to-be-moderated live streaming room to uniformly determine whether violation content exists in the current live streaming frame, such that the target violation score of the current live streaming frame is output. In this case, the secondary violation moderation is performed on the target violation score based on the multi-angle feature fusion analysis on the visual picture features and the multi-dimensional behavior feature, without an additional moderation device, such that the violation moderation costs are reduced, and the accuracy and recall property of violation moderation of live streaming rooms are ensured.

According to the technical solutions provided in the embodiments, the preliminary violation moderation is performed on the current live streaming frame in the to-be-moderated live streaming room by the cascaded high-accuracy moderation model and high-recall moderation model, such that a violation live streaming frame which is easily distinguished and has an obvious violation is moderated and found quickly. For the current live streaming frame that passes the preliminary violation moderation and is hard to distinguish or has an unobvious violation, the uniform feature analysis combining the visual picture features and the behavior features is performed again on the current live streaming frame by the behavior moderation model based on the first violation score of the current live streaming frame under the high-accuracy moderation model and the second violation score of the current live streaming frame under the high-recall moderation model and in conjunction with the multi-dimensional behavior feature of the current live streaming frame in the to-be-moderated live streaming room, such that the target violation score of the current live streaming frame is acquired, and the comprehensive violation moderation of the current live streaming frame in the to-be-moderated live streaming room is achieved. The problems of false rejection and false acceptance of live streaming moderation are avoided, and the accuracy and recall rate of the live streaming moderation are improved on the basis of reduction in the violation moderation costs.

Second Embodiments

Figure 2A:
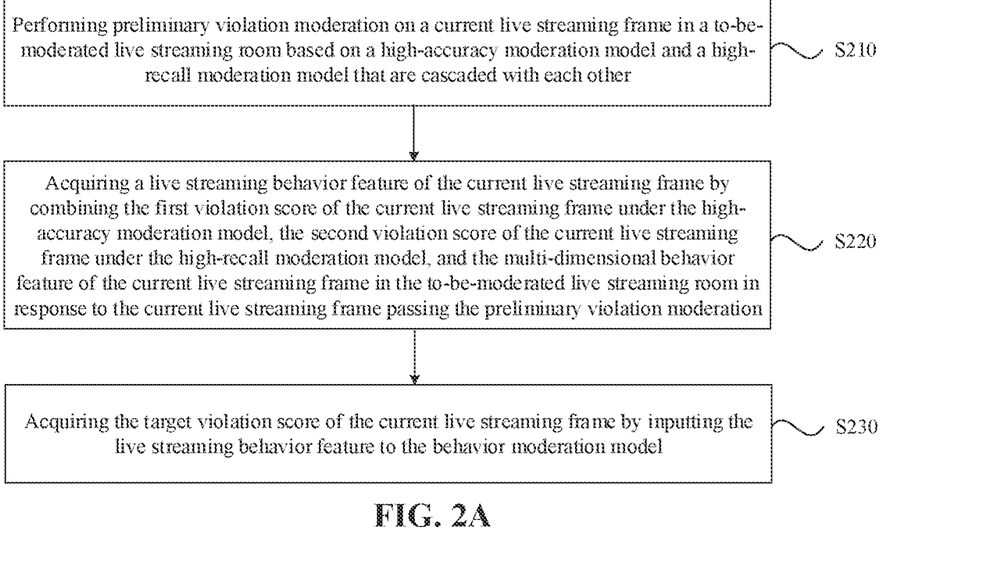
FIG. 2A is a flow chart of a method for moderating living streaming according to second embodiment of the present disclosure.
Figure 2B:
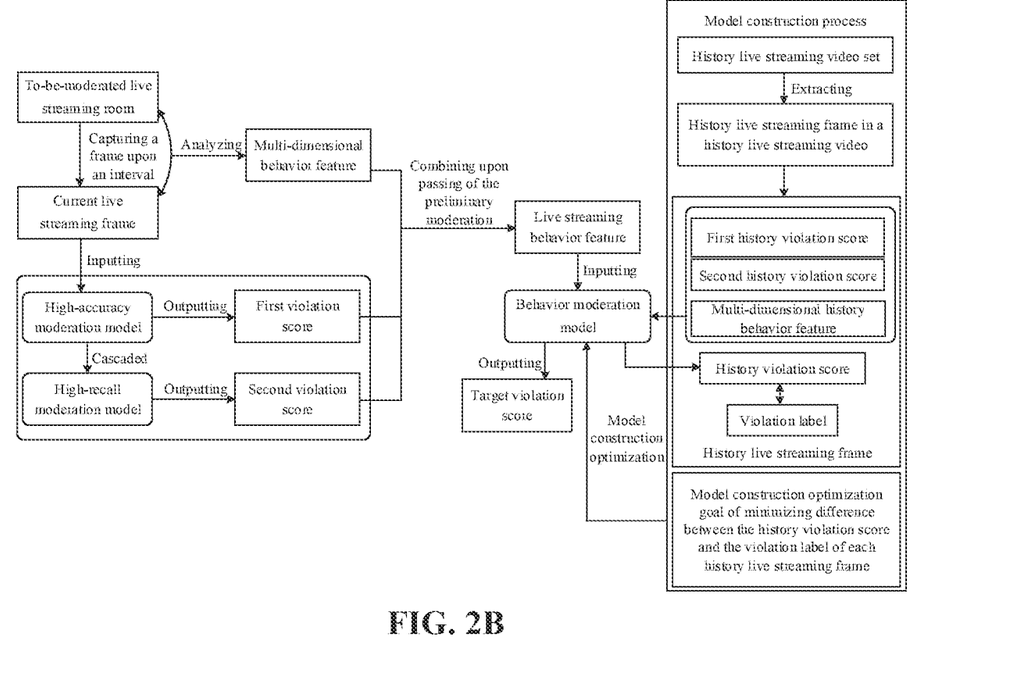
FIG. 2B is a schematic diagram of a live streaming moderation process according to second embodiments of the present disclosure.

FIG. 2A is a flow chart of a method for moderating living streaming according to second embodiments of the present disclosure, and FIG. 2B is a schematic diagram of a live streaming moderation process according to second embodiments of the present disclosure. The embodiments are illustrated on the basis of the above embodiments. As shown in FIG. 2A, a process of the secondary violation moderation of the current live streaming frame in the to-be-moderated live streaming room and a construction process of the behavior moderation model are explained in the embodiments.

In some embodiments, as shown in FIG. 2A, the embodiments include the following steps.

In S210, the preliminary violation moderation is performed on the current live streaming frame in the to-be-moderated live streaming room based on the high-accuracy moderation model and the high-recall moderation model that are cascaded with each other.

In S220, the live streaming behavior feature of the current live streaming frame is acquired by combining the first violation score of the current live streaming frame under the high-accuracy moderation model, the second violation score of the current live streaming frame under the high-recall moderation model, and the multi-dimensional behavior feature of the current live streaming frame in the to-be-moderated live streaming room in response to the current live streaming frame passing the preliminary violation moderation.

In some embodiments, in the case that the current live streaming frame passes the preliminary violation moderation, both the high-accuracy moderation model and the high-recall moderation model determine that no violation content exists in the current live streaming frame. Therefore, the secondary violation moderation is performed on the current live streaming frame based on the visual picture features of the current live streaming frame and the behavior features of the current live streaming frame to ensure the accuracy of live streaming moderation and avoid false acceptance of violation moderation. In this case, the first violation score of the current live streaming frame under the high-accuracy moderation model and the second violation score of the current live streaming frame under the high-recall moderation model are determined. The first violation score and the second violation score are determined as the visual picture features corresponding to the current live streaming frame. Meanwhile, the multi-dimensional behavior feature of the current live streaming frame in the to-be-moderated live streaming room is determined based on the multiple live streaming interaction behaviors in the to-be-moderated live streaming room at the live streaming time of the current live streaming frame. The live streaming behavior feature of the current live streaming frame is acquired by combining the first violation score, the second violation score, and the multi-dimensional behavior feature and is determined as a multi-angle fusion feature under the secondary violation moderation. The live streaming behavior feature is used subsequently to determine whether violation content exists in the current live streaming frame, such that the comprehensiveness and accuracy of the live streaming moderation can be ensured.

For example, the live streaming behavior feature in the embodiments is $X=(x1, x2, \ldots, x11)$. $x1$ represents the first violation score of the current live streaming frame under the high-accuracy moderation model, $x2$ represents the second violation score of the current live streaming frame under the high-recall moderation model, $x3$ represents a real-time number of audiences in the to-be-moderated live streaming room in the multi-dimensional behavior feature, $x4$ represents a number of comments posted by users to the public screen in the to-be-moderated live streaming room in the multi-dimensional behavior feature, $x5$ represents a number of violation comments on the public screen in the to-be-moderated live streaming room in the multi-dimensional behavior feature, $x6$ represents a percentage of the violation comments on the public screen to all the comments on the public screen in the to-be-moderated live streaming room in the multi-dimensional behavior feature, $x7$ represents a number of live streaming rewards in the to-be-moderated live streaming room in the multi-dimensional behavior feature, $x8$ represents a number of history violations of the live streamer in the to-be-moderated live streaming room in the multi-dimensional behavior feature, $x9$ represents a percentage of the history violations of the live streamer in the to-be-moderated live streaming room in the multi-dimensional behavior feature, $x10$ represents a number of history voice violations of the live streamer in the to-be-moderated live streaming room in the multi-dimensional behavior feature, and $x11$ represents a percentage of the history voice violations of the live streamer in the to-be-moderated live streaming room in the multi-dimensional behavior feature.

The multi-dimensional behavior feature in the embodiments is dynamically configured to ensure the accuracy of the live streaming violation moderation, which is not limited.

In S230, the target violation score of the current live streaming frame is acquired by inputting the live streaming behavior feature to the behavior moderation model.

In some embodiments, upon acquisition of the live streaming behavior feature, the live streaming behavior feature is determined as a multi-angle violation fusion feature and input to the pre-constructed behavior moderation model. Fusion analysis is performed on a feature value of the live streaming behavior feature under each dimension by the behavior moderation model to determine whether violation content information exists, the target violation score of the current live streaming frame is output, and then whether violation content exists in the current live streaming frame is determined based on the target violation score, such that the accuracy of the live streaming moderation is improved.

For example, in the embodiments the behavior moderation model is constructed by: extracting a corresponding history live streaming frame from each history live streaming video in a history live streaming video set, and determining a multi-dimensional history behavior feature of each history live streaming frame in a live streaming room where the each history live streaming frame is located and a violation label of the history live streaming frame; acquiring a history violation score of the history live streaming frame by inputting a first history violation score of the history live streaming frame under the high-accuracy moderation model, a second history violation score of the history live streaming frame under the high-recall moderation model, and a multi-dimensional history behavior feature of the history live streaming frame in the live streaming room to the pre-constructed behavior moderation model for each history live streaming frame; and continuously optimizing the behavior moderation model to minimize a difference between the history violation score and the violation label of each history live streaming frame.

The history live streaming video set for model construction is constructed by searching for history live streaming videos of a plurality of live streaming rooms. As the violation moderation is mainly performed on live streaming frames in the live streaming process in the violation moderation on the live streaming rooms, video frame extraction needs to be performed on each history live streaming video in the history live streaming video set. For example, a history live streaming picture is captured from each history live streaming video every predetermined duration and is determined as a history live streaming frame extracted from the history live streaming video. In this case, all the extracted history live streaming frames form model construction samples of the behavior moderation model.

In this case, for successful construction of the behavior moderation model, it is necessary to set a plurality of model construction features for reference in the model construction process and a model construction optimization goal of the behavior moderation model, such that actual model construction conditions under the plurality of model construction features are optimized based on the model construction optimization goal. For example, the model construction features in the embodiments are X=(x1, x2, . . . , x11). x1 represents the first history violation score of the history live streaming frame under the high-accuracy moderation model, x2 represents the second history violation score of the history live streaming frame under the high-recall moderation model, x3 represents a real-time number of audiences in the live streaming room of the history live streaming frame in the set multi-dimensional history behavior feature, x4 represents a number of comments posted by users to the public screen in the live streaming room of the history live streaming frame in the multi-dimensional history behavior feature, x5 represents a number of violation comments on the public screen in the live streaming room of the history live streaming frame in the multi-dimensional history behavior feature, x6 represents a percentage of the violation comments on the public screen to all the comments on the public screen in the live streaming room of the history live streaming frame in the multi-dimensional history behavior feature, x7 represents a number of live streaming rewards in the live streaming room of the history live streaming frame in the multi-dimensional history behavior feature, x8 represents a number of history violations of the live streamer in the live streaming room of the history live streaming frame in the multi-dimensional history behavior feature, x9 represents a percentage of the history violations of the live streamer in the live streaming room of the history live streaming frame in the multi-dimensional history behavior feature, x10 represents a number of history voice violations of the live streamer in the live streaming room of the history live streaming frame in the multi-dimensional history behavior feature, and x11 represents a percentage of the history voice violations of the live streamer in the live streaming room of the history live streaming frame in the multi-dimensional history behavior feature.

As the multi-dimensional history behavior features, in the plurality of model construction features, of the history live streaming frames in the live streaming rooms are determined in the history live streaming process, upon extraction of the corresponding history live streaming frame from each history live streaming video, the multi-dimensional history behavior feature of each history live streaming frame in the live streaming room is determined by determining history live streaming interaction behaviors of the history live streaming frame in the live streaming room. Meanwhile, the violation label of each history live streaming frame is determined, as shown in FIG. 2B, such that continuous model construction optimization is subsequently performed based on the model construction optimization goal. For each history live streaming frame, the history live streaming frame is input to the high-accuracy moderation model and the high-recall moderation model in the embodiments, such that the first history violation score and the second history violation score of each history live streaming frame are acquired. On this basis, the first history violation score of each history live streaming frame, the second history violation score of each history live streaming frame, and the multi-dimensional history behavior feature of each history live streaming frame in the live streaming room of the history live streaming frame are combined to form the model construction features corresponding to each history live streaming frame, and the history violation scores of each history live streaming frame are acquired by continuously inputting the model construction features corresponding to each history live streaming frame to the behavior moderation model.

In this case, the model construction optimization goal of the behavior moderation model in the embodiments is to minimize the difference between the history violation score and the violation label of each history live streaming frame. Therefore, the difference between the history violation score of each history live streaming frame and the violation label of each history live streaming frame is continuously analyzed in the model construction optimization process, and the difference is continuously reduced by optimizing mathematical parameters in the behavior moderation model, such that the goal of minimizing the difference between the history violation score and the violation label of the history live streaming frame, and a finally optimized behavior moderation model is acquired. In this case, the finally optimized behavior moderation model has high-accuracy violation moderation capability.

For example, the model construction optimization goal of the behavior moderation model in the embodiments is:

$$\min \sum_{x^i \in V} (\hat{y}^i - y^i)^2 \text{ s.t. } \hat{y}^i = p(x^i).$$

$x^i$ represents a model construction feature of an $i^{th}$ history live streaming frame, $y^i=0$ represents a violation label of the $i^{th}$ history live streaming frame, $y^i=1$ indicates that violation content exists, $y^i=0$ indicates that no violation content exists, $\hat{y}^i$ represents a history violation score determined by the behavior moderation model for the $i^{th}$ history live streaming frame, $V=(x^1, x^2, L, x^m)$ indicates a model construction sample including history live streaming frames, m represents a number of samples, and $p(x^i)$ represents a prediction probability of $x^i$ acquired by the behavior moderation model.

According to the technical solutions in the embodiments, the behavior moderation model is constructed based on the model construction optimization goal of minimizing the difference between the history violation score and the violation label of each history live streaming frame, such that the accuracy of violation moderation based on the behavior moderation model is ensured. The live streaming behavior feature of the current live streaming frame is subsequently acquired by combining the first violation score of the current live streaming frame in the to-be-moderated live streaming room under the high-accuracy moderation model, the second violation score of the current live streaming frame in the to-be-moderated live streaming room under the high-recall moderation model, and the multi-dimensional behavior feature of the current live streaming frame in the to-be-moderated live streaming room, and the multi-angle violation feature analysis is performed on the live streaming behavior feature based on the constructed behavior moderation model, such that the accuracy and recall rate of live streaming moderation are improved.

Third Embodiments

Figure 3A:
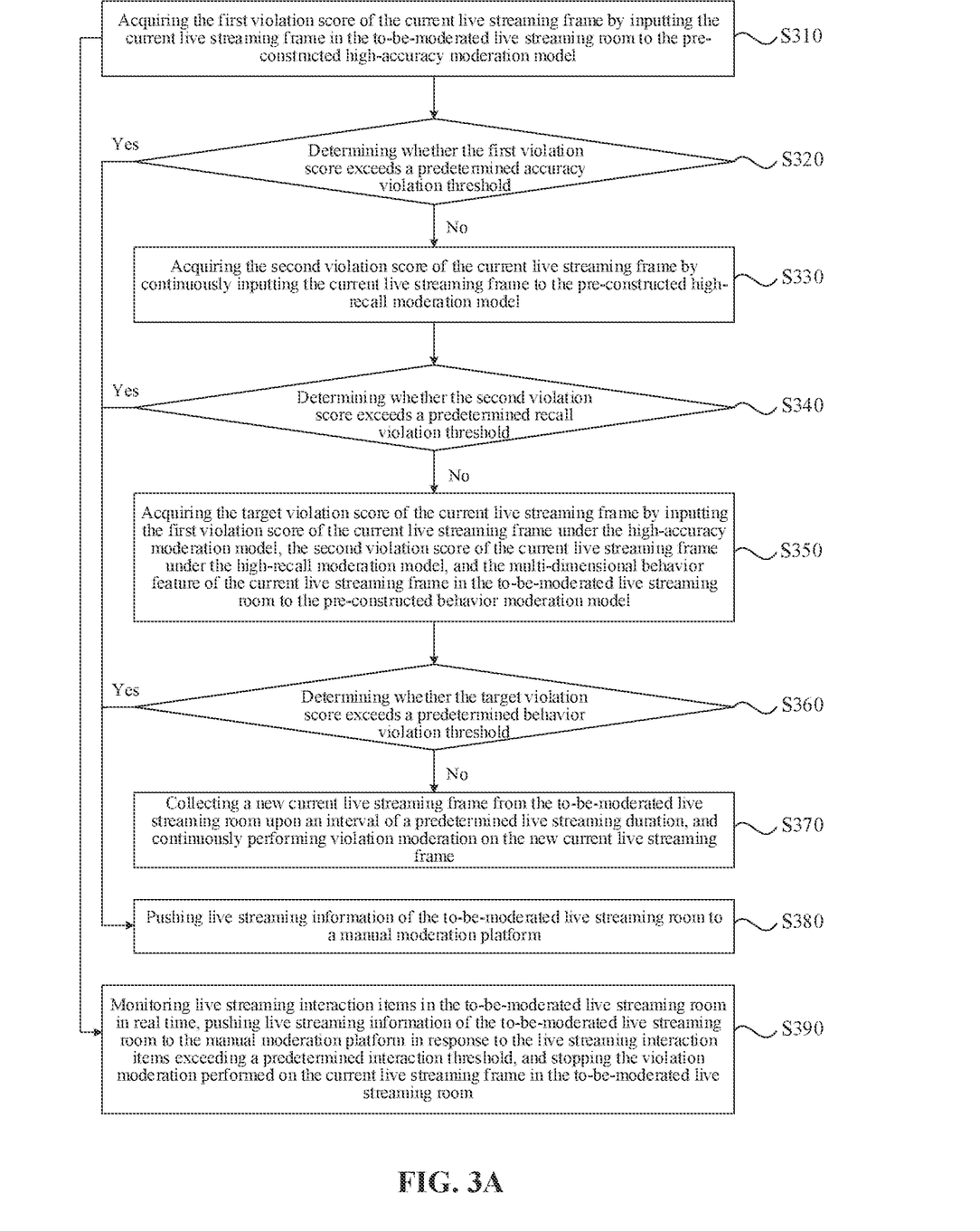
FIG. 3A is a flow chart of a method for moderating living streaming according to third embodiments of the present disclosure.
Figure 3B:
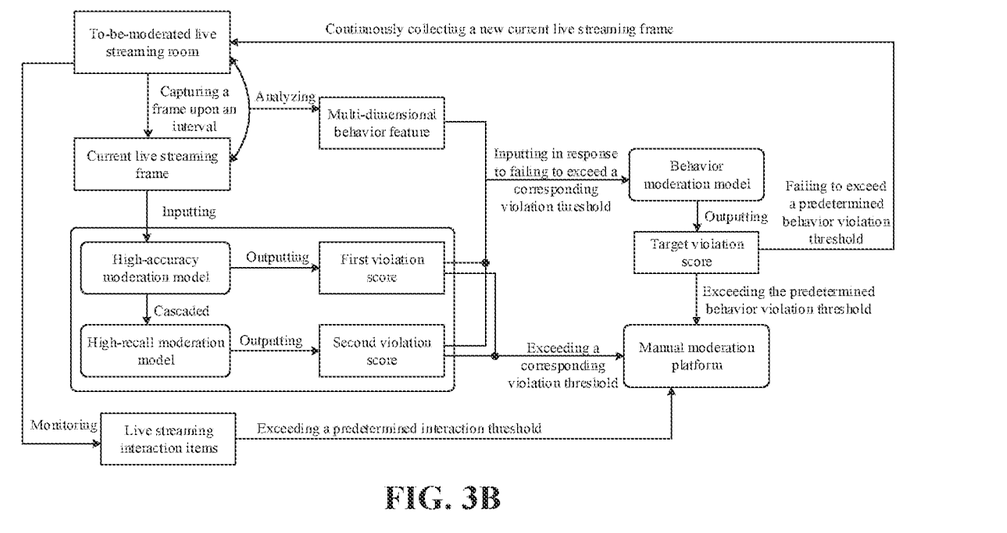
FIG. 3B is a schematic diagram of a live streaming moderation process according to third embodiments of the present disclosure.

FIG. 3A is a flow chart of a method for moderating living streaming according to third embodiments of the present disclosure; and FIG. 3B is a schematic diagram of a live streaming moderation process according to third embodiments of the present disclosure. The embodiments are illustrated on the basis of the above embodiments. As shown in FIG. 3A, the overall violation moderation process of the to-be-moderated live streaming room in the embodiments is explained.

In some embodiments, as shown in FIG. 3A, the embodiments include the following steps.

In S310, the first violation score of the current live streaming frame is acquired by inputting the current live streaming frame in the to-be-moderated live streaming room to the pre-constructed high-accuracy moderation model.

In some embodiments, in performing the violation moderation on the to-be-moderated live streaming room, whether violation content exists in a live streaming picture is reviewed in real time in the live streaming process, such that the violation moderation needs to be performed on the current live streaming frame in the live streaming process in real time. The current live streaming frame is input to the pre-constructed high-accuracy moderation model, the preliminary violation moderation is performed on the live streaming picture in the current live streaming frame by the high-accuracy moderation model, such that the first violation score of the current live streaming frame is output. Then, whether violation content exists in the current live streaming frame is determined by subsequently determining whether the first violation score exceeds a predetermined accuracy violation threshold.

In S320, whether the first violation score exceeds a predetermined accuracy violation threshold is determined; if yes, S380 is performed; and if no, S330 is performed.

S330, the second violation score of the current live streaming frame is acquired by continuously inputting the current live streaming frame to the pre-constructed high-recall moderation model.

In some embodiments, in the case that the first violation score fails to exceed the predetermined accuracy violation threshold, the high-accuracy moderation model determines that no violation content exists in the current live streaming frame. However, as the high-accuracy moderation model has false acceptance of violation moderation, the current live streaming frame needs to be continuously input to the pre-constructed high-recall moderation model. As shown in FIG. 3B, corresponding violation moderation is continuously performed on the live streaming picture in the current live streaming frame by the high-recall moderation model, such that the second violation score of the current live streaming frame is output. Then, whether violation content exists in the current live streaming frame is determined again by subsequently determining whether the second violation score exceeds a predetermined recall violation threshold.

In S340, whether the second violation score exceeds a predetermined recall violation threshold is determined; if yes, S380 is performed; and if no, S350 is performed.

In the case that the second violation score fails to exceed the predetermined recall violation threshold, the high-recall moderation model also determines that no violation content exists in the current live streaming frame. That is, the current live streaming frame passes the violation moderation of the high-accuracy moderation model and the violation moderation of the high-recall moderation model, namely, the current live streaming frame passes the preliminary violation moderation. The secondary violation moderation is continuously performed on the current live streaming frame by the behavior moderation model. The current live streaming frame is determined to pass the preliminary violation moderation in the case that the first violation score of the current live streaming frame fails to exceed the predetermined accuracy violation threshold and the second violation score of the current live streaming frame fails to exceed the predetermined recall violation threshold.

In S350, a target violation score of the current live streaming frame is acquired by inputting the first violation score of the current live streaming frame under the high-accuracy moderation model, the second violation score of the current live streaming frame under the high-recall moderation model, and the multi-dimensional behavior feature of the current live streaming frame in the to-be-moderated live streaming room to the pre-constructed behavior moderation model.

In S360, whether the target violation score exceeds a predetermined behavior violation threshold is determined; if yes, S380 is performed; and if no, S370 is performed.

In some embodiments, upon outputting of the target violation score of the current live streaming frame by the behavior moderation model, whether violation content exists in the current live streaming frame is finally reviewed by determining whether the target violation score exceeds the predetermined behavior violation threshold, such that different live streaming processing processes are performed.

In S370, a new current live streaming frame is collected from the to-be-moderated live streaming room upon an interval of a predetermined live streaming duration, and violation moderation is continuously performed on the new current live streaming frame.

In some embodiments, in the case that the target violation score fails to exceed the predetermined behavior violation threshold, the behavior moderation model determines that no violation content exists in the current live streaming frame. In this case, the three models in the embodiments all determine that no violation content exists in the current live streaming frame, and it is determined that the current live streaming frame is a non-violation frame, which indicates that no violation content exists in the to-be-moderated live streaming room currently. In this case, for the instantaneity of violation moderation of the live streaming room, upon the interval (for example, every 2s) of the predetermined live streaming duration, a new live streaming picture is continuously captured from the to-be-moderated live streaming room at current live streaming time and is determined as a new collected current live streaming frame. Violation moderation is continuously performed on the new current live streaming frame according to S310 to S380 in the embodiments, such that real-time violation moderation is performed on the to-be-moderated live streaming room until the live streaming is ended or a violation live streaming frame is found.

In S380, live streaming information of the to-be-moderated live streaming room is pushed to a manual moderation platform.

In some embodiments, in the case that the first violation score exceeds the predetermined accuracy violation threshold, or the second violation score exceeds the predetermined recall violation threshold, or the target violation score exceeds the predetermined behavior violation threshold, the model used for current moderation determines that violation content exists in the current live streaming frame. As shown in FIG. 3B, an additional manual moderation platform is further provided to avoid the false rejection in the violation moderation in the embodiments. In the case that violation content in the current live streaming frame is found by moderation, the live streaming information of the to-be-moderated live streaming room of the current live streaming frame is pushed to the manual moderation platform to further perform manual moderation on live streaming content of the to-be-moderated live streaming room, such that the accuracy of live streaming moderation is ensured.

In the embodiments, the live streaming information of the to-be-moderated live streaming room is a live streaming address of the to-be-moderated live streaming room, a live video picture, or the like, which is not limited herein.

In S390, live streaming interaction items in the to-be-moderated live streaming room are monitored in real time, live streaming information of the to-be-moderated live streaming room is pushed to the manual moderation platform in response to the live streaming interaction items exceeding a predetermined interaction threshold, and the violation moderation performed on the current live streaming frame in the to-be-moderated live streaming room is stopped.

In some embodiments, whether to directly push the live streaming information to the manual moderation platform for manual moderation is determined by monitoring the live streaming interaction items in the to-be-moderated live streaming room in real time on the basis of achieving live streaming violation moderation by constructing models to avoid an abnormality in the violation moderation and ensure a high recall rate of the live streaming moderation, and the manual moderation is determined as a moderation abnormality ensuring solution of the live streaming moderation. In this case, the live streaming interaction items include a number of live streaming views, a number of live streaming rewards, and the like in the to-be-moderated live streaming room, such that an acceptance degree of the to-be-moderated live streaming room is analyzed. In the case that the live streaming interaction items exceed the predetermined interaction threshold, the acceptance degree of the to-be-moderated live streaming room is extremely great. Violation content is quickly spread out once it appears. Therefore, the live streaming information of the to-be-moderated live streaming room needs to be directly pushed to the manual moderation platform for manual moderation to ensure high efficiency of the live streaming violation moderation. Meanwhile, the violation moderation performed on the current live streaming frame in the to-be-moderated live streaming room by the multiple constructed models is stopped.

According to the technical solutions in the embodiments, upon the violation content in the current live streaming frame being determined, the live streaming information of the to-be-moderated live streaming room is directly pushed to the manual moderation platform for manual moderation, such that the false rejection of the violation moderation is avoided, and the accuracy of the live streaming violation moderation is improved. Meanwhile, an abnormality ensuring solution for the live streaming moderation is additionally set based on the live streaming interaction items in the to-be-moderated live streaming room, and the comprehensiveness of the live streaming violation moderation is ensured.

Fourth Embodiments

Figure 4:
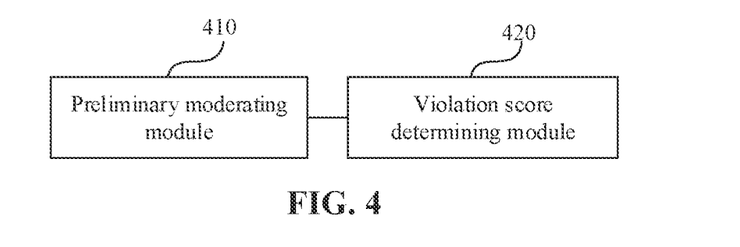
FIG. 4 is a schematic structural diagram of an apparatus for moderating living streaming according to fourth embodiments of the present disclosure.

FIG. 4 is a schematic structural diagram of an apparatus for moderating live streaming according to fourth embodiments of the present disclosure. As shown in FIG. 4, the apparatus for moderating live streaming includes:

a preliminary moderating module 410, configured to perform preliminary violation moderation on a current live streaming frame in a to-be-moderated live streaming room based on a high-accuracy moderation model and a high-recall moderation model that are cascaded with each other; and a violation score determining module 420, configured to acquire a target violation score of the current live streaming frame by inputting a first violation score of the current live streaming frame under the high-accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation.

According to the technical solutions in the embodiments, the preliminary violation moderation is performed on the current live streaming frame in the to-be-moderated live streaming room by the cascaded high-accuracy moderation model and high-recall moderation model, such that a violation live streaming frame which is easily distinguished and has an obvious violation is moderated and found quickly. For the current live streaming frame that passes the preliminary violation moderation and is hard to distinguish or has an unobvious violation, the uniform feature analysis combining the visual picture features and the behavior features is performed again on the current live streaming frame by the behavior moderation model based on the first violation score of the current live streaming frame under the high-accuracy moderation model and the second violation score of the current live streaming frame under the high-recall moderation model and in conjunction with the multi-dimensional behavior feature of the current live streaming frame in the to-be-moderated live streaming room, such that the target violation score of the current live streaming frame is acquired, and the comprehensive violation moderation of the current live streaming frame in the to-be-moderated live streaming room is achieved. The problems of false rejection and false acceptance of live streaming moderation are avoided, and the accuracy and recall rate of the live streaming moderation are improved on the basis of reduction in the violation moderation costs.

The apparatus for moderating live streaming in the embodiments is applicable to the method for moderating living streaming in any embodiment above, and has corresponding functions and effects.

Fifth Embodiments

Figure 5:
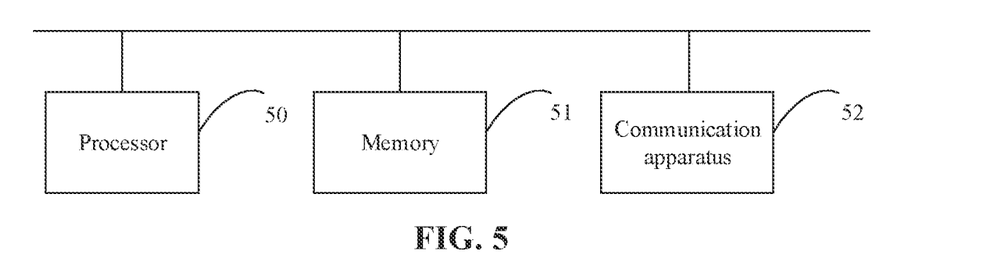
FIG. 5 is a schematic structural diagram of a server according to fifth embodiments of the present disclosure.

FIG. 5 is a schematic structural diagram of a server according to fifth embodiments of the present disclosure. As shown in FIG. 5, the server includes a processor 50, a memory 51, and a communication apparatus 52. The number of processors 50 in the server is one or more, and by way of example, one processor 50 is shown in FIG. 5. The processor 50, the memory 51, and the communication apparatus 52 in the server are connected by a bus or other means, and by way of example, they are connected by a bus in FIG. 5.

The server in the embodiments is applicable to the method for moderating living streaming in any embodiment above, and has corresponding functions and effects.

Sixth Embodiments

The sixth embodiment of the present disclosure further provides a computer-readable storage medium storing a computer program thereon. The computer program, when loaded and run by a processor, causes the processor to perform the method according to any one of the above embodiments. The method includes:

performing preliminary violation moderation on a current live streaming frame in a to-be-moderated live streaming room based on a high-accuracy moderation model and a high-recall moderation model that are cascaded with each other; and acquiring a target violation score of the current live streaming frame by inputting a first violation score of the current live streaming frame under the high-accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation.

The embodiments of the present disclosure provide a storage medium containing computer-executable instructions. The computer-executable instructions are not limited to performing the above method operations, but also can perform related operations in the method for moderating living streaming according to any embodiment of the present disclosure. The storage medium may be a non-transitory storage medium.

The present disclosure may be implemented by software, general-purpose hardware, or hardware. The technical solutions of the present disclosure are embodied in the form of a software product. The computer software product is stored in a computer-readable storage medium, such as, a floppy disk, a read-only memory (ROM), a random access memory (RAM), a flash (FLASH), a hard disk, or an optical disk of a computer, and includes a plurality of instructions for causing a computer device (which may be a personal computer, a server, a network device, or the like) to perform the method for moderating living streaming according to the embodiments of the present disclosure.

In the above embodiments of the apparatus for moderating live streaming, the plurality of units and modules are only divided according to a function logic, but are not limited to the above division, as long as corresponding functions are achieved. In addition, the names of the plurality of function units are merely for convenience of distinguishing from each other, and are not intended to limit the protection scope of the present disclosure.

What is claimed is:

1. A method for moderating live streaming, comprising:
performing preliminary violation moderation on a current live streaming frame in a to-be-moderated live streaming room based on a high-accuracy moderation model and a high-recall moderation model that are cascaded with each other; and
acquiring a target violation score of the current live streaming frame by inputting a first violation score of the current live streaming frame under the high-accuracy moderation model, a second violation score of the current live streaming frame under the high-recall moderation model, and a multi-dimensional behavior feature of the current live streaming frame in the to-be-moderated live streaming room to a pre-constructed behavior moderation model in response to the current live streaming frame passing the preliminary violation moderation;
wherein performing the preliminary violation moderation on the current live streaming frame in the to-be-moderated live streaming room based on the high-accuracy moderation model and the high-recall moderation model that are cascaded with each other comprises:
acquiring the first violation score of the current live streaming frame by inputting the current live streaming frame in the to-be-moderated live streaming room to a pre-constructed high-accuracy moderation model; and
acquiring the second violation score of the current live streaming frame by continuously inputting the current live streaming frame to a pre-constructed high-recall moderation model in response to the first violation score failing to exceed a predetermined accuracy violation threshold;
wherein the current live streaming frame is determined to pass the preliminary violation moderation in response to the first violation score of the current live streaming frame failing to exceed the predetermined accuracy violation threshold and the second violation score of the current live streaming frame failing to exceed a predetermined recall violation threshold.

2. The method according to claim 1, wherein acquiring the target violation score of the current live streaming frame by inputting the first violation score of the current live streaming frame under the high-accuracy moderation model, the second violation score of the current live streaming frame under the high-recall moderation model, and the multi-dimensional behavior feature of the current live streaming frame in the to-be-moderated live streaming room to the pre-constructed behavior moderation model comprises:
acquiring a live streaming behavior feature of the current live streaming frame by combining the first violation score of the current live streaming frame under the high-accuracy moderation model, the second violation score of the current live streaming frame under the high-recall moderation model, and the multi-dimensional behavior feature of the current live streaming frame in the to-be-moderated live streaming room; and
acquiring the target violation score of the current live streaming frame by inputting the live streaming behavior feature to the behavior moderation model.

3. The method according to claim 1, wherein the behavior moderation model is constructed by:

extracting a corresponding history live streaming frame from each history live streaming video in a history live streaming video set, and determining a multi-dimensional history behavior feature of each history live streaming frame in a live streaming room where the each history live streaming frame is located and a violation label of the history live streaming frame;

acquiring a history violation score of the history live streaming frame by inputting a first history violation score of the history live streaming frame under the high-accuracy moderation model, a second history violation score of the history live streaming frame under the high-recall moderation model, and a multi-dimensional history behavior feature of the history live streaming frame in the live streaming room to the pre-constructed behavior moderation model for each history live streaming frame; and continuously optimizing the behavior moderation model to minimize a difference between the acquired history violation score and the violation label of each history live streaming frame.

4. The method according to claim 1, wherein upon acquiring the target violation score of the current live streaming frame by inputting the first violation score of the current live streaming frame under the high-accuracy moderation model, the second violation score of the current live streaming frame under the high-recall moderation model, and the multi-dimensional behavior feature of the current live streaming frame in the to-be-moderated live streaming room to the pre-constructed behavior moderation model, the method further comprises:

pushing live streaming information of the to-be-moderated live streaming room to a manual moderation platform in response to a to-be-moderated violation score exceeding a predetermined behavior violation threshold; and collecting a new current live streaming frame from the to-be-moderated live streaming room upon an interval of a predetermined live streaming duration in response to the target violation score failing to exceed the predetermined behavior violation threshold, and continuously performing violation moderation on the new current live streaming frame.

5. The method according to claim 4, further comprising: monitoring live streaming interaction items in the to-be-moderated live streaming room in real time, pushing live streaming information of the to-be-moderated live streaming room to the manual moderation platform in response to the live streaming interaction items exceeding a predetermined interaction threshold, and stopping the violation moderation performed on the current live streaming frame in the to-be-moderated live streaming room.

6. The method according to claim 1, further comprising: pushing the live streaming information of the to-be-moderated live streaming room to a manual moderation platform in a case that the first violation score exceeds the predetermined accuracy violation threshold or the second violation score exceeds the predetermined recall violation threshold.

7. The method according to claim 1, wherein training samples of the high-accuracy moderation model comprise easy positive samples and easy negative samples in a training sample set, and training samples of the high-recall moderation model comprise hard positive samples and hard negative samples in the training sample set.

8. A server, comprising:
one or more processors; and
a memory, configured to store one or more programs;
wherein the one or more processors, when loading and running the one or more programs, are caused to perform the method for moderating live streaming as defined in claim 1.

9. A non-transitory computer-readable storage medium, storing a computer program, wherein the computer program, when loaded and run by a processor, causes the processor to perform the method for moderating live streaming as defined in claim 1.

10. The server according to claim 8, wherein the one or more processors, when loading and running the one or more programs, are caused to:

acquire a live streaming behavior feature of the current live streaming frame by combining the first violation score of the current live streaming frame under the high-accuracy moderation model, the second violation score of the current live streaming frame under the high-recall moderation model, and the multi-dimensional behavior feature of the current live streaming frame in the to-be-moderated live streaming room; and acquire the target violation score of the current live streaming frame by inputting the live streaming behavior feature to the behavior moderation model.

11. The server according to claim 8, wherein the behavior moderation model is constructed by:

extracting a corresponding history live streaming frame from each history live streaming video in a history live streaming video set, and determining a multi-dimensional history behavior feature of each history live streaming frame in a live streaming room where the each history live streaming frame is located and a violation label of the history live streaming frame;

acquiring a history violation score of the history live streaming frame by inputting a first history violation score of the history live streaming frame under the high-accuracy moderation model, a second history violation score of the history live streaming frame under the high-recall moderation model, and a multi-dimensional history behavior feature of the history live streaming frame in the live streaming room to the pre-constructed behavior moderation model for each history live streaming frame; and continuously optimizing the behavior moderation model to minimize a difference between the history violation score and the violation label of each history live streaming frame.

12. The server according to claim 8, wherein the one or more processors, when loading and running the one or more programs, are caused to:

push live streaming information of the to-be-moderated live streaming room to a manual moderation platform in response to a to-be-moderated violation score exceeding a predetermined behavior violation threshold; and collect a new current live streaming frame from the to-be-moderated live streaming room upon an interval of a predetermined live streaming duration in response to the target violation score failing to exceed the predetermined behavior violation threshold, and continuously perform violation moderation on the new current live streaming frame.

13. The server according to claim 12, the one or more processors, when loading and running the one or more programs, are caused to:

monitor live streaming interaction items in the to-be-moderated live streaming room in real time, pushing live streaming information of the to-be-moderated live streaming room to the manual moderation platform in response to the live streaming interaction items exceeding a predetermined interaction threshold, and stop the violation moderation performed on the current live streaming frame in the to-be-moderated live streaming room.

14. The server according to claim 8, the one or more processors, when loading and running the one or more programs, are caused to:

push live streaming information of the to-be-moderated live streaming room to a manual moderation platform in a case that the first violation score exceeds the predetermined accuracy violation threshold or the second violation score exceeds the predetermined recall violation threshold.

15. The server according to claim 8, wherein training samples of the high-accuracy moderation model comprise easy positive samples and easy negative samples in a training sample set, and training samples of the high-recall moderation model comprise hard positive samples and hard negative samples in the training sample set.

* * * * *